Patented Apr. 17, 1934

1,955,135

UNITED STATES PATENT OFFICE 1,955,135

HALOGEN-BENZANTHRONE AND PROCESS OF MAKING SAME

Max Albert Kunz, Mannheim, and Karl Koeberle, Ludwigshafen-on-the-Rhine, Germany, assignors to General Aniline Works, Inc., New York, N. Y., a corporation of Delaware No Drawing. Application August 20, 1932, Serial No. 629,753. In Germany March 13, 1928

5 Claims. (Cl. 260—61)

The present invention relates to new halogen-benzanthrones and a process of making same.

We have found that valuable halogen-benzanthrones are obtained by acting on benzanthrone which may be substituted by halogen atoms and/or methyl groups in a sulphuric acid with a halogen.

Throughout this application and the appended claims the term "a sulphuric acid" is meant to cover not only sulphuric acid itself, but also fuming sulphuric and especially chlorosulphonic acid, the latter being particularly valuable for use as reaction medium.

Similarly, the term "halogen" is meant to include only chlorine and bromine.

Preferably the reaction is carried out with an addition of a halogen carrier, for which purpose use made be made of selenium, iron, sulphur, iodine, antimony, arsenic, bismuth, mercury or compounds thereof, such as for instance the amalgams or several of these substances. The amounts thereof preferably added vary in accordance with their efficiency, but do not exceed in general 10 per cent calculated on the amount of the substance subjected to halogenation.

When carrying out the halogenation in chlorosulphonic acid in the presence of a halogen carrier, the process according to the present invention has the advantage that no substantial loss by the formation of halogen hydride takes place. Thus, it is possible to act on one molecular proportion of the initial material with less than one molecular proportion of halogen for each atom of halogen to be introduced into the said compound. In many cases even the calculated amount of halogen i. e. as many atomic proportions of halogen as halogen atoms are to be introduced into each molecule of the initial material, are sufficient, in particular when it is intended to produce compounds of a low halogen content. If, however, compounds of a high halogen content are to be produced, an excess of halogen over the calculated amount is suitably employed, since at the higher temperatures necessary for the production of highly halogenated products, it cannot always be avoided that small amounts of halogen escape from the reaction mixture, which, however, may again be condensed and reintroduced into the reaction mixture, if desired. An excess of about from 10 to 20 per cent of halogen over the calculated amount will be sufficient nearly in all cases, but an excess up to about 50 per cent will sometimes be advisable.

Attention is to be given to the fact that the chloro-sulphonic acid may react with the substance under treatment, for example, by oxidizing, sulphonating, or chlorinating the substance. If such side-reactions are to be avoided not too high temperatures should be employed, but the treatment rather be prolonged. In order to avoid such by-reactions, the reaction is started at ordinary room temperature or even lower, and only then heating is applied, whereby the temperature may be as high as about 100° C., but should preferably not exceed 80° C. A temperature between 60° and 70° C. for example is very suitable. The aforesaid by-reactions may also be avoided by introducing the benzanthrone into a solution of the halogen in the sulphuric acid used.

It is possible by the process according to the present invention to produce not only chloro- or bromo-derivatives, but also chloro-bromo-derivatives of benzanthrone.

The crude reaction products may be purified by the usual methods such as recrystallization, sublimation, boiling with solvents or treatment with oxidizing agents, for example with hypochlorite solution.

The following examples will further illustrate the nature of the present invention, but the invention is not restricted thereto. The parts are by weight.

Example 1

23 parts of benzanthrone are dissolved in 200 parts of chlorosulphonic acid, while stirring. After the addition of 2 parts of sulphur 8.8 parts of bromine are run into the said solution which is then slowly warmed to between 40° and 50° C. which temperature is maintained until all of the bromine has been taken up, whereupon the reaction mixture is allowed to cool, diluted with 200 parts of concentrated sulphuric acid, poured into water, the whole being then boiled up, if desired, and filtered by suction. The reaction product obtained, a monobromobenzanthrone according to analysis, is a yellow powder crystallizing from glacial acetic acid in compact needles.

When carrying out the reaction with 17 parts of bromine, a dibromo-benzanthrone is obtained which is a yellow crystalline powder melting at about 240° to 248° C. It is probably a mixture of Bz 1.6- and Bz 1.7-dibromobenzanthrone.

Example 2

3 parts of sulphur are added to 230 parts of chlorosulphonic acid, whereupon the mixture is saturated wtih chlorine by introducing chlorine gas at 0° C. 23 parts of benzanthrone are then added at between 0° and 5° C. and the mass is stirred for 2 hours at between 20° and 25° C., whereupon the reaction product is separated by pouring the mass into water, filtering and drying. The resulting benzanthrone containing from 2 to 3 atoms of chlorine per molecule is a yellow powder dissolving in concentrated sulphuric acid giving a crimson red solution.

*Example 3*

26.8 parts of 6-chloro-benzanthrone are introduced at 0° C. into a solution of 20 parts of bromine, 1 part of iodine and 1 part of sulphur in 260 parts of chlorosulphonic acid, whereupon the mass is heated, while stirring, for 2 hours to 40° C. and for 1 further hour to 65° C. The product is worked up in the usual manner. The resulting 6-chloro-dibromo-benzanthrone crystallizes in amber yellow needles and melts at above 280° C.

*Example 4*

31 parts of Bz 1-bromobenzanthrone are introduced at 0° C., while stirring into a solution of 16 parts of bromine and 2 parts of iodine in 250 parts of chlorosulphonic acid, whereupon the mass is heated for 2 hours to 40° C. and for a further hour to 60° C. The product is worked up as usual; it is a tribromo-benzanthrone.

In a similar manner a crystalline tetrabromo-benzanthrone is obtained by treating 22 parts of benzanthrone with 40 parts of bromine.

By introducing in an analogous manner benzanthrone into a solution of chlorine and bromine in chlorosulphonic acid, a chloro-bromo-benzanthrone is obtained.

*Example 5*

24.5 parts of 2-methylbenzanthrone are introduced at below 5° C., while stirring, into a solution of 20 parts of bromine and 1 part of antimony in 200 parts of chloro-sulphonic acid, whereupon the mass is stirred for several hours at 40° C. and for a further hour at 60° C., then allowed to cool and worked up in the usual manner. The reaction product is a dibromo-2-methylbenzanthrone crystallizing in yellow needles and dissolving in concentrated sulphuric acid giving an orange-red solution.

In a similar manner a dibromo derivative is obtained by brominating benzanthrone in sulphuric acid mono-hydrate.

This application is a continuation-in-part of our copending application Ser. No. 345,882, filed March 9th, 1929.

What we claim is:—

1. The process of producing a halogen derivative of benzanthrone which comprises acting with bromine in a sulphuric acid at a temperature not exceeding 100° C. in the presence of a halogen carrier selected from the group consisting of sulphur, selenium and iodine on a compound corresponding to the formula

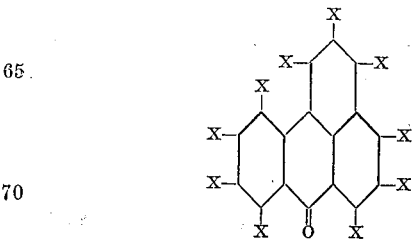

in which one X is hydrogen or halogen or a methyl group, the other X's being hydrogen.

2. The process of producing a halogen derivative of benzanthrone which comprises acting with bromine in chlorosulphonic acid at a temperature not exceeding 100° on a compound corresponding to the formula

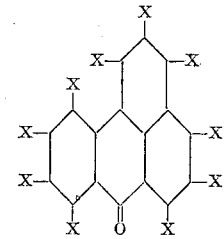

in which one X is hydrogen or halogen or a methyl group, the other X's being hydrogen.

3. The process of producing a halogen derivative of benzanthrone which comprises acting with bromine in chlorosulphonic acid at a temperature not exceeding 100° C. in the presence of a halogen carrier on a compound corresponding to the formula

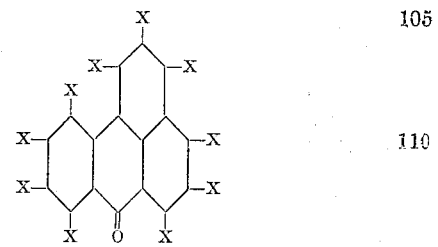

in which one X is hydrogen or halogen or a methyl group, the other X's being hydrogen.

4. The process of producing a halogen derivative of benzanthrone which comprises acting with bromine in chlorosulphonic acid at a temperature not exceeding 100° C. in the presence of a halogen carrier selected from the group consisting of sulphur, selenium and iodine on a compound corresponding to the formula

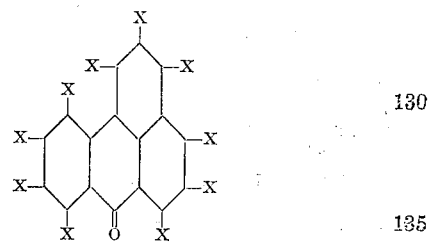

in which one X is hydrogen or halogen or a methyl group, the other X's being hydrogen.

5. Dibromo-benzanthrone forming a yellow crystalline powder, melting at about 240° to 248° C. and being probably a mixture of Bz 1.6 and Bz 1.7-dibromobenzanthrone.

MAX ALBERT KUNZ.
KARL KOEBERLE.